United States Patent
Sheng et al.

(10) Patent No.: US 8,099,462 B2
(45) Date of Patent: Jan. 17, 2012

(54) METHOD OF DISPLAYING INTERACTIVE EFFECTS IN WEB CAMERA COMMUNICATION

(75) Inventors: Dueg-Uei Sheng, Taipei County (TW); Teng-Yuan Hsiao, Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 190 days.

(21) Appl. No.: 12/111,148

(22) Filed: Apr. 28, 2008

(65) Prior Publication Data

US 2009/0271705 A1 Oct. 29, 2009

(51) Int. Cl.
*G06F 15/16* (2006.01)
*G09G 5/00* (2006.01)
*G06K 9/40* (2006.01)
*G06K 9/62* (2006.01)

(52) U.S. Cl. ........ 709/204; 345/629; 345/632; 345/633; 382/274; 382/118

(58) Field of Classification Search .................. 715/700, 715/758, 764, 768, 790, 853; 348/207.99, 348/14.15, 14.08; 375/240.01; 345/629, 345/619, 632, 633, 418; 382/118
See application file for complete search history.

(56) References Cited

U.S. PATENT DOCUMENTS

| | | | |
|---|---|---|---|
| 7,342,587 B2* | 3/2008 | Danzig et al. | 345/473 |
| 7,636,755 B2* | 12/2009 | Blattner et al. | 709/206 |
| 2004/0221224 A1* | 11/2004 | Blattner et al. | 715/500.1 |
| 2006/0195786 A1* | 8/2006 | Stoen et al. | 715/700 |
| 2007/0064112 A1* | 3/2007 | Chatting et al. | 348/207.99 |
| 2007/0200925 A1* | 8/2007 | Kim | 348/14.08 |
| 2007/0260984 A1* | 11/2007 | Marks et al. | 715/706 |
| 2007/0266170 A1* | 11/2007 | Mockett | 709/231 |
| 2007/0268312 A1* | 11/2007 | Marks et al. | 345/633 |
| 2008/0068507 A1* | 3/2008 | Krause et al. | 348/570 |
| 2008/0101456 A1* | 5/2008 | Ridge et al. | 375/240.01 |
| 2008/0112315 A1* | 5/2008 | Hu et al. | 370/230 |
| 2008/0276272 A1* | 11/2008 | Rajaraman et al. | 725/37 |
| 2009/0202114 A1* | 8/2009 | Morin et al. | 382/118 |
| 2009/0210778 A1* | 8/2009 | Kulas et al. | 715/201 |
| 2009/0221367 A1* | 9/2009 | Longley et al. | 463/32 |

* cited by examiner

*Primary Examiner* — Joseph Avellino
*Assistant Examiner* — Aftab Nasir Khan
(74) *Attorney, Agent, or Firm* — Winston Hsu; Scott Margo (57) ABSTRACT

To allow for greater interactivity in video chat environments, displaying multiple effects from a sender of a first electronic device to a chat client of a second electronic device on a video chat region starts with the sender selecting an effect. If the selected effect has a predetermined mapping interactive effect, the interactive effect is displayed on the chat client. Then, the sender applies the effect or the interactive effect to an application region of the video chat region of the chat client. The application region is a partial or an entire region of the video chat region.

18 Claims, 8 Drawing Sheets

| Mapping action effect | Effect (video stream 110) | Application region (sender) | Interactive effect (video stream 120) | Application region (chat peer) |
|---|---|---|---|---|
| Interactive kiss effect | Kiss | Lips | Kiss | Right Eye |
| Interactive punch effect | Fist | Whole region | Black eye | Right Eye |
| Interactive glasses effect | Not shown | Not shown | Glasses | Eyes and ear area |

FIG. 8

METHOD OF DISPLAYING INTERACTIVE EFFECTS IN WEB CAMERA COMMUNICATION

BACKGROUND OF THE INVENTION

1. Field of the Invention

The present invention relates to video communication, and more particularly, to a method of displaying interactive effects in web camera communication.

2. Description of the Prior Art

Chat programs, such as MSN Messenger, Yahoo! Messenger, and AOL Instant Messenger, take advantage of a network connection between two or more devices to provide text, voice, and video chat communication between users of the devices. When available bandwidth was severely limited, most chat clients, such as those mentioned above, only offered text chat, with users sending text messages to each other that would be displayed in a chat window. However, as the available bandwidth has increased, and more users are equipped with broadband cable or DSL lines, the chat clients have begun offering display of emoticons and images, as well as transfer of files, such as documents and songs.

Although video chat has been available for many years, only recently have advances in video codecs, serial interfaces, and web camera technology allowed for widespread use of video chat. Further, as not only desktop and notebook personal computers are networked, but now mobile devices, such as PDAs and smartphones, are also able to establish network connections through GPRS or 802.11-type network adapters, video chat is growing in popularity, and is now widely available as a feature in the above-mentioned chat clients, as well as other chat clients.

As video chat increases in popularity and use, users may now add effects to their own video window, such as frames and borders, or hearts, stars, and kisses. However, there is a need to enhance interaction between users when chatting via a web camera.

SUMMARY OF THE INVENTION

According to the present invention, a method of displaying multiple effects from a sender of a first electronic device to a chat client of a second electronic device on a video chat region comprises the sender selecting an effect, checking whether the selected effect has a predetermined mapping interactive effect, if the selected effect has a predetermined mapping interactive effect, displaying the interactive effect on the chat client, and the sender applying the effect or the interactive effect to an application region of the video chat region of the chat client. The application region is a partial or an entire region of the video chat region.

According to the present invention, an electronic device for providing interactive effects in video chat comprises a display, data transmission circuitry, and a memory including an effect, a mapping action effect list, and video chat program code. The code is for applying the effect to an application region of a video chat region of a chat client. The application region is a partial or an entire region of the video chat region. The electronic device further comprises a processor coupled to the display, the data transmission circuitry, and the memory for executing the video chat program code, reading the effect, controlling the data transmission circuitry to transmit data corresponding to the effect to a chat client, and controlling the display to display video corresponding to the effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
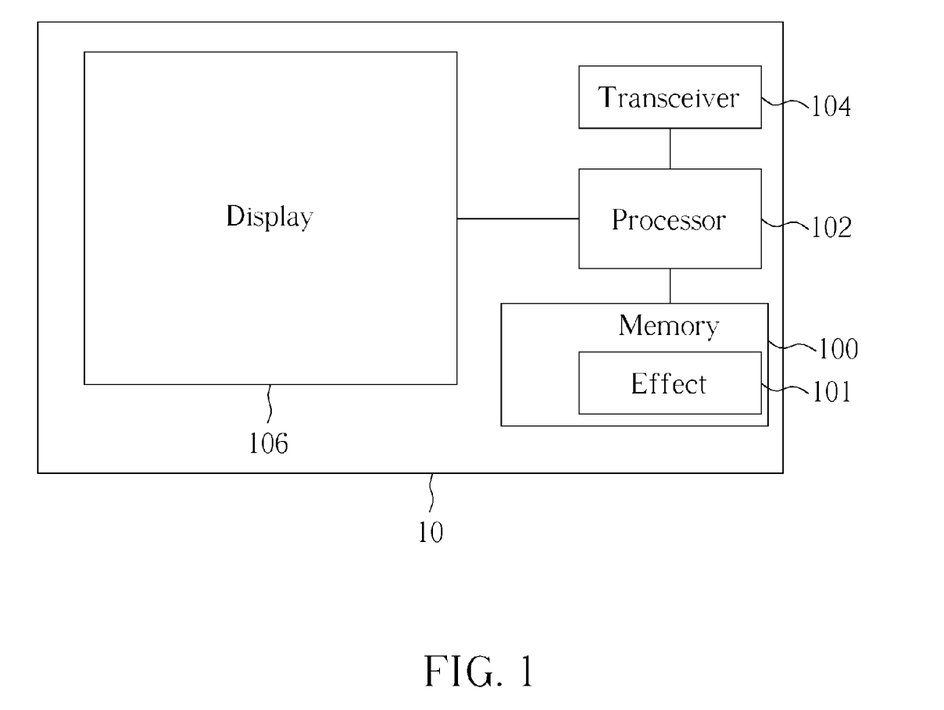
FIG. 1 is a block diagram of an apparatus for sending an interactive effect according to the present invention.

Please refer to FIG. 1, which is a block diagram of an apparatus 10 for sending an interactive effect according to the present invention. The apparatus 10 may be a personal computer, a mobile phone, a smart phone, or any other electronic device with a wired or wireless network connection. The apparatus 10 comprises a memory 100, a processor 102, a transceiver 104 having data transmission circuitry and data reception circuitry, and a display 106. The processor 102 may be coupled to the memory 100, the transceiver 604, and the display 106. A bank of preexisting effects 101 may be stored in the memory 100. The processor 102 may be utilized for executing video chat program code stored in the memory 100, reading the effect 101, controlling the data transmission circuitry to transmit data corresponding to the effect 101 to a chat client, and controlling the display 106 to display video corresponding to the effect 101. The processor 102 may also be utilized for modifying the data corresponding to the effect 101 in accordance with user input before transmitting the data to the chat client. The memory 100 may also include a mapping action effect list and video chat program code for implementing the method described hereinafter.

Figure 2:
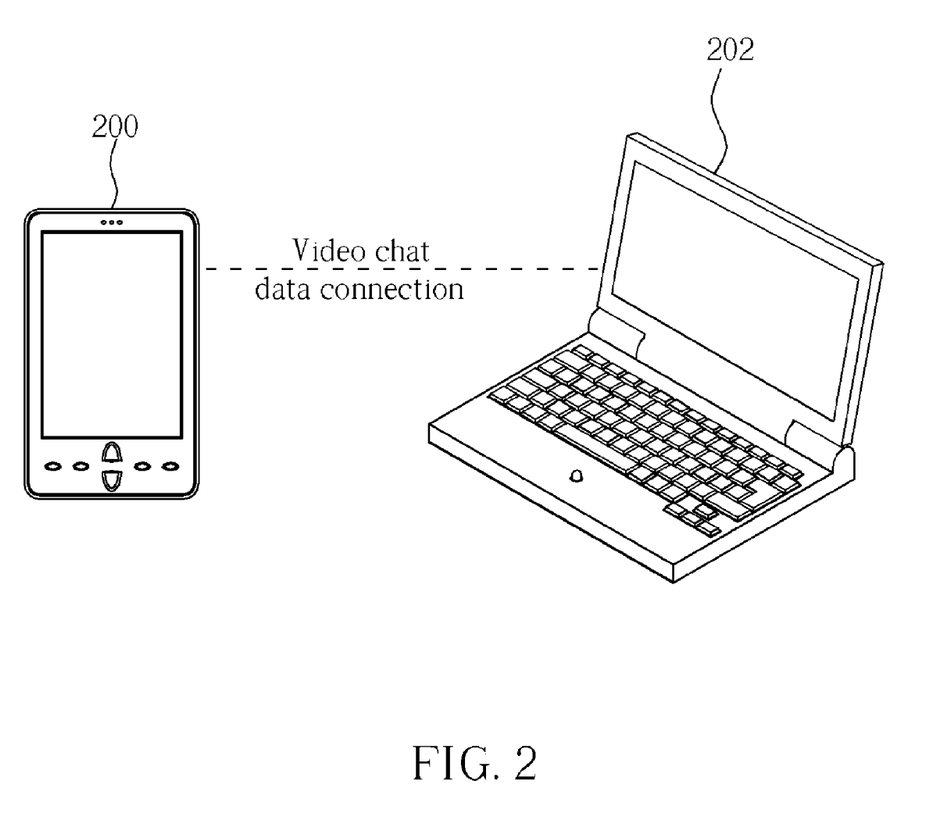
FIG. 2 is a diagram of electronic devices engaged in video chat according to the present invention.

Please refer to FIG. 2, which is a diagram of electronic devices engaged in video chat according to the present invention. The method of the present invention may be directed at a chat client. The chat client may be utilized to allow data transfer and display over a network connection from a first electronic device 200 to a second electronic device 202, as shown in FIG. 2, the second electronic device 202 representing a chat client of the first electronic device 200, and vise versa. The first and second electronic devices 200, 202 may both be the apparatus 10, and may be notebooks, desktops, mobile phones, PDA, smart phones, any electronic device with a wired or wireless Internet connection, or any combination of the above. The chat client may have a graphical user interface (GUI), which may include various graphical regions for inputting text, displaying text, displaying images, and displaying video. The chat client may also generate audio outputs to speakers, either based on sound files or voice chat audio.

Typically, a conversation may be set up, in which the chat client may allow transfer of text, images, video, and audio between members of the conversation. For example, the conversation may include a first user on the first electronic device 200 and a second user on the second electronic device 202, or multiple users on multiple electronic devices. In the conversation, typically the chat client on each electronic device will display all text, images, and video inputted by each of the users participating in the conversation. The chat client typically will also play all sounds inputted by each of the users.

Regarding the video inputted by each user in the conversation, in addition to displaying video clips uploaded by each user, the chat client may also allow for each user to input a video stream from a video recording device, such as a webcam, which may be embedded and located above the display or connected to the electronic device through an input port, such as a Universal Serial Bus (USB) port. The video stream from each user may then be displayed in the chat client on each of the electronic devices. Typically, the user inputting the video stream may select a video resolution for recording and inputting the video stream, and each user in the conversation may adjust a display resolution for displaying the video stream. Each user may also selectively enable and disable the video stream from each user in the conversation to limit bandwidth use.

The present invention is directed at establishing methods of enhancing the video stream displayed in the chat client with interactive effects (or simply, "effects") as well as at providing examples of such interactive effects. Please refer to FIG. 3, which is a diagram of an interactive kiss effect displayed on two different electronic devices. The interactive kiss effect may be initiated by, for example, the first user of the first electronic device, and targeted at the video stream of the second user of the second electronic device, for display in all or some of the video regions of each user in the conversation corresponding to the second user. The interactive kiss effect primarily causes two video effects. First, the interactive kiss effect causes an overlay of a kiss graphic 330, or animated kiss graphic, on the video stream 310 corresponding to lips of the first user. Second, the interactive kiss effect causes an overlay of the kiss graphic 330, or animated kiss graphic, on the video stream 320 corresponding to the second user. As will be described below, the kiss graphic 330 may be modified based on customization options selected by the first user through an input device coupled to the processor 102, and thus may be displayed differently on the video stream 310 and the video stream 320.

Figure 3:
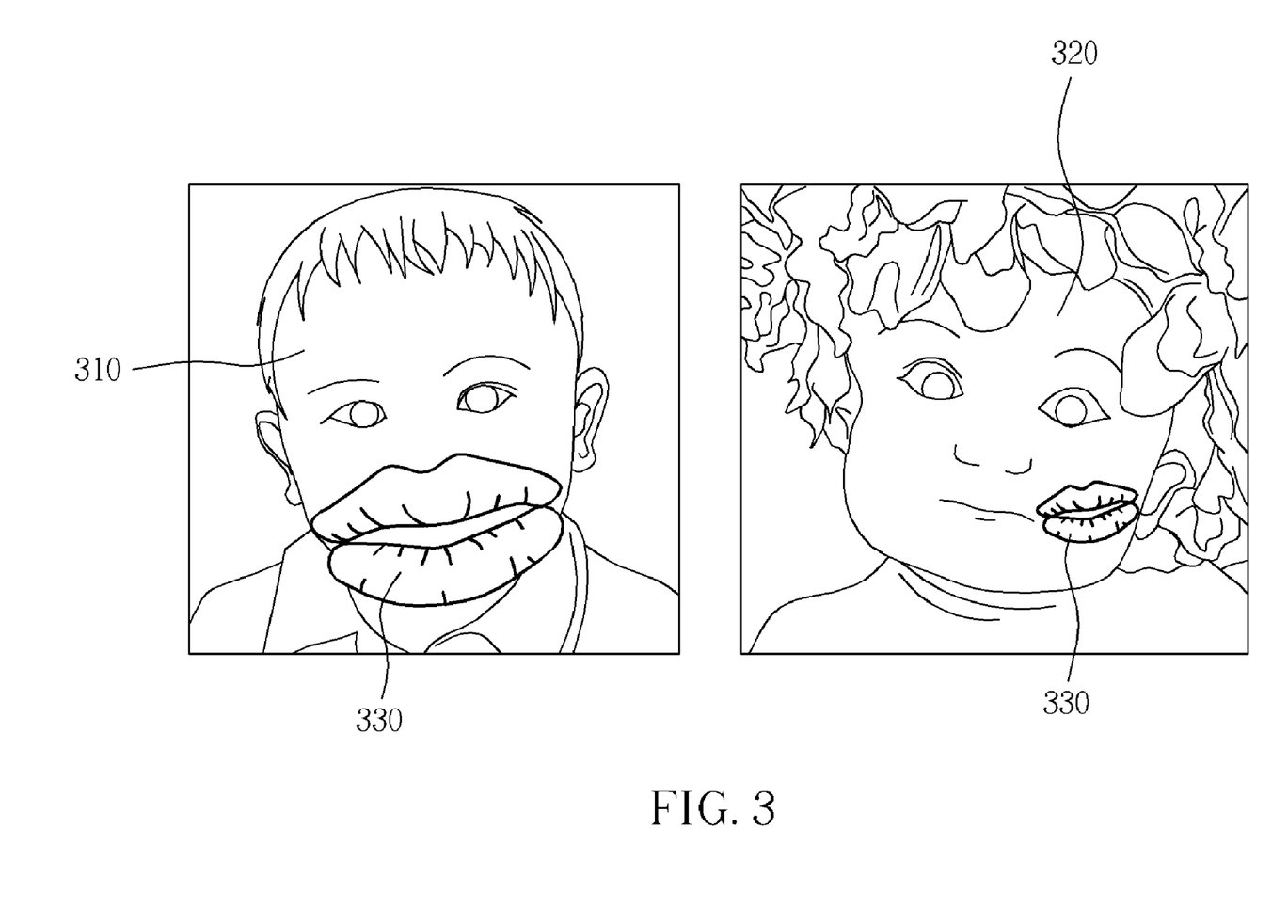
FIG. 3 is a diagram of an interactive kiss effect according to the present invention.

In greater detail, the interactive kiss effect may be initiated by the first user through a mouse click, a button press, a hotkey, or other selection method. For example, an interactive effects menu may be displayed in the chat client GUI, and the interactive kiss effect may be displayed in the interactive effects menu for selection by the first user. Once the first user has selected the interactive kiss effect, an effect dialogue or customization function may be displayed in the chat client for customizing the interactive kiss effect before transmitting the interactive kiss effect to the second user, or to each user of the conversation. The interactive kiss effect may be customized by selecting color of the kiss graphic or animated kiss graphic, rotation or distortion of the kiss graphic or animated kiss graphic, and scale of the kiss graphic or animated kiss graphic.

Another customization option provided by the present invention is also available. In the present invention, the chat client may provide face recognition technology, which may be incorporated as face recognition program code stored in the memory 100. For example, the video stream 320 of the second user may include the second user's face. Utilizing the face recognition technology, the chat client may identify and track facial features of the second user's facial features, such as a nose, eyes, eyebrows, cheeks, mouth, ears, and hair. Thus, the customization function may request that the first user select on of the facial features to which the effect may be applied. As shown in FIG. 3, the first user may select the left cheek of the second user for application of the interactive kiss effect. The interactive kiss effect may also have presets for each customization option mentioned above. For example, the location may have a preset of left cheek, or right cheek. The size may have a preset of 50, or 70 pixels. Any presets may also be stored in the memory 100.

Once all of the customization options have been selected, the interactive kiss effect may be transmitted to each user of the conversation, preferably through the transceiver 104. Preferably, the chat client of each user may receive the interactive kiss effect and all of the customization options, and each chat client may apply the interactive kiss effect to the video region corresponding to the second user. Though less preferable, the chat client of the second user may also apply the interactive kiss effect to the video stream 320 of the second user prior to transmission. In this way, processing load may be confined to the second electronic device. However, the video stream 320 of the second user may be delayed by processing, and enabling and disabling of display of the interactive kiss effect may then be limited to the second user.

If processing is performed in each chat client, each user may individually enable and disable, or even delete, the interactive kiss effect, and other effects, in their chat client on the original video stream 320 received from the second user. For example, after the interactive kiss effect has been applied, each user of the conversation may selectively modify the location of the interactive kiss effect as displayed in their respective chat client. Whereas the first user selected the left cheek for application of the interactive kiss effect, another user may move the interactive kiss effect to the right cheek, or to the lips of the video stream 320 corresponding to the second user. The size, scale, and color may also be modified after transmission of the effect, or the effect may be disabled as well. Such modification or deletion may be activated through an input device coupled to the processor 102.

Figure 4:
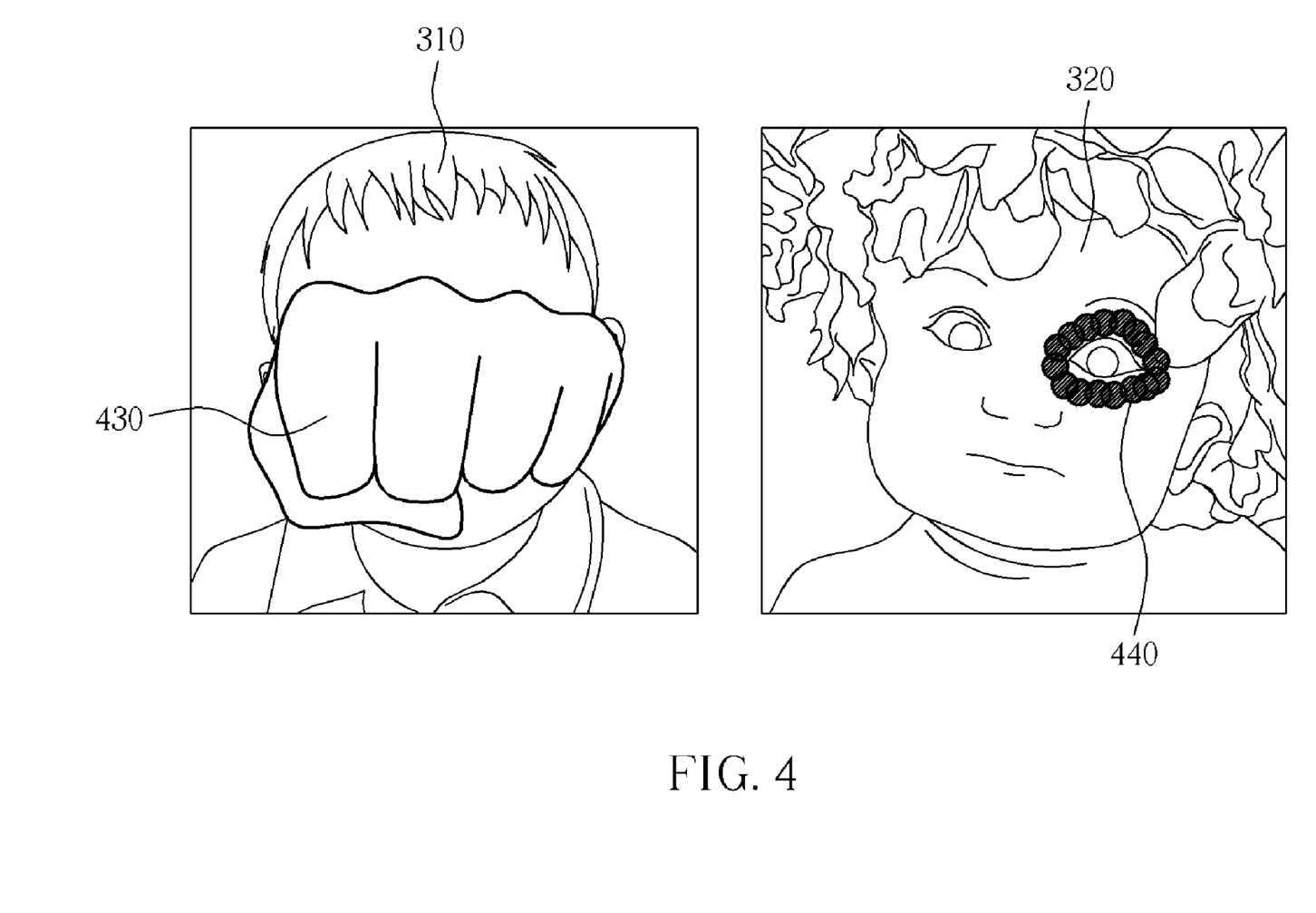
FIG. 4 is a diagram of an interactive punch effect according to the present invention.

Please refer to FIG. 4, which is a diagram of an interactive punch effect. While similar to the interactive kiss effect in that the interactive punch effect displays a first 430 in the video stream 310 and a black eye 440 in the video stream 320, the interactive punch effect departs from the interactive kiss effect in that the black eye 440 in the video stream 320 is a different graphic from the first 430 in the video stream 320, as opposed to the kiss 330, which is displayed in both the video stream 310 and the video stream 320.

Color, scale, and rotation of both the first 430 and the black eye 440 may be customizable, and location of the first 430 and the black eye 440 as displayed in the video stream 310 and the video stream 320, respectively, may also be customizable. Application of the black eye 440 may be limited to the right eye and the left eye of the video stream 320. For extension to the other facial features of the video stream 320, a generic bruise graphic, or a bloody nose graphic, may also be applied. The black eye 440 may be disabled or deleted by the second user, or by each user of the conversation individually. Or, the black eye 440 may be processed into the video stream 320 by the chat client of the second user before transmission of the video stream 320 to the other users of the conversation. The color, size, rotation, and location of the first 430 and the black eye 440 may also be set with presets.

Figure 5:
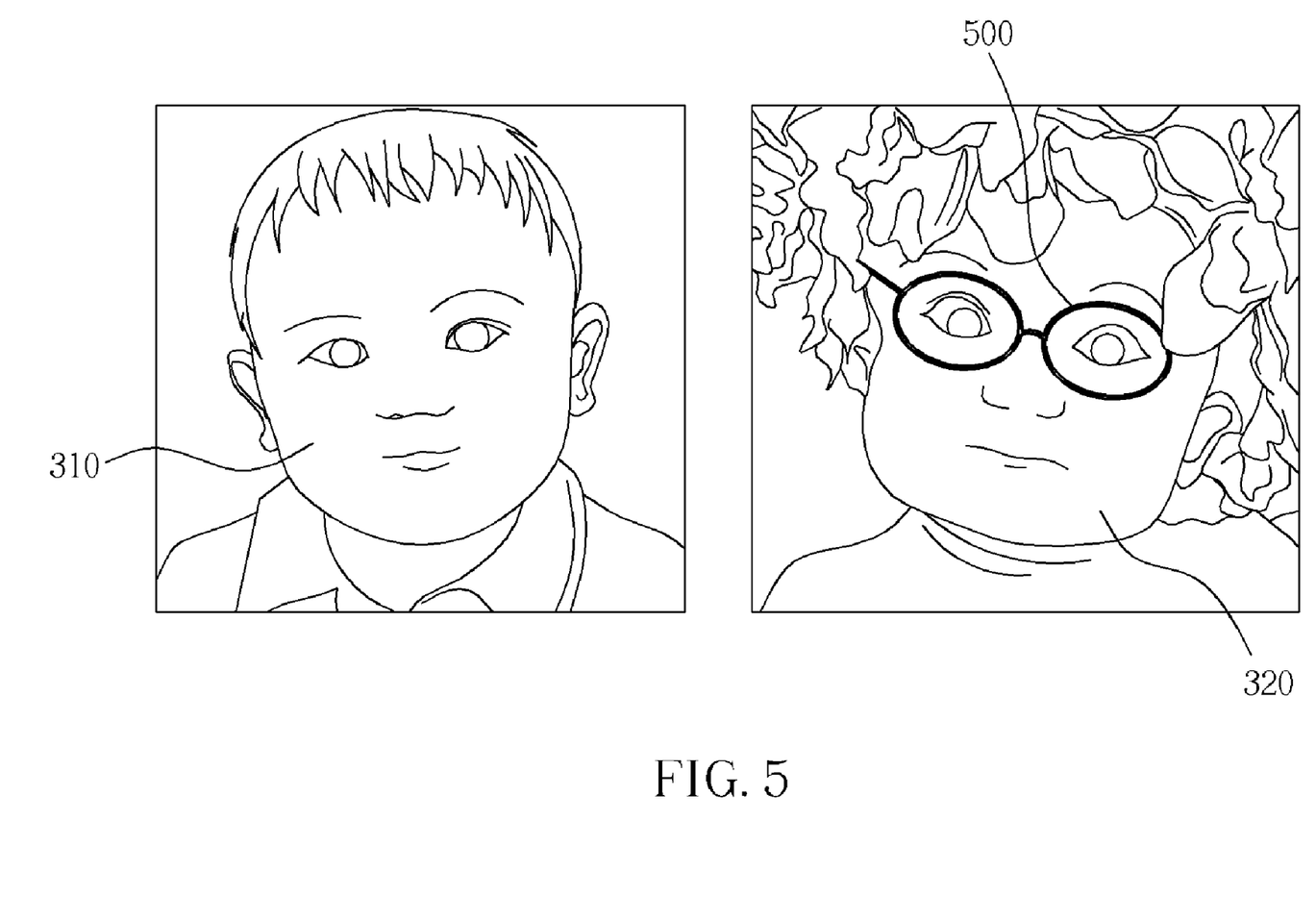
FIG. 5 is a diagram of an interactive glasses effect according to the present invention.

Please refer to FIG. 5, which is a diagram of an interactive glasses effect. The interactive glasses effect may be utilized to overlay a glasses graphic 500 on the video stream 320, without overlaying a corresponding graphic on the video stream 310. In other words, compared to the interactive kiss effect and the interactive punch effect, in which the kiss 330 and the first 430 are overlaid on the video stream 310, when utilizing the interactive glasses effect, no graphic is overlaid in the video stream 310. The glasses graphic 500 may be customized for color, scale, and rotation, as well as location. By default, the glasses graphic 500 may be scaled, rotated, and positioned with respect to the eyes, and also the ears, of the video stream 320. For example, a line may be determined based on the eyes of the video stream 320, and the glasses graphic 500 may be rotated based on the line. Size and separation of the eyes may be utilized to scale the glasses graphic 500. The glasses graphic 500 may comprise a plurality of graphic regions, e.g. a right lens, a left lens, a bridge, a right temple, and a left temple. Thus, each of the graphic regions may be automatically positioned on the video stream 320 utilizing predetermined positioning rules stored in the memory 100.

Figure 8:
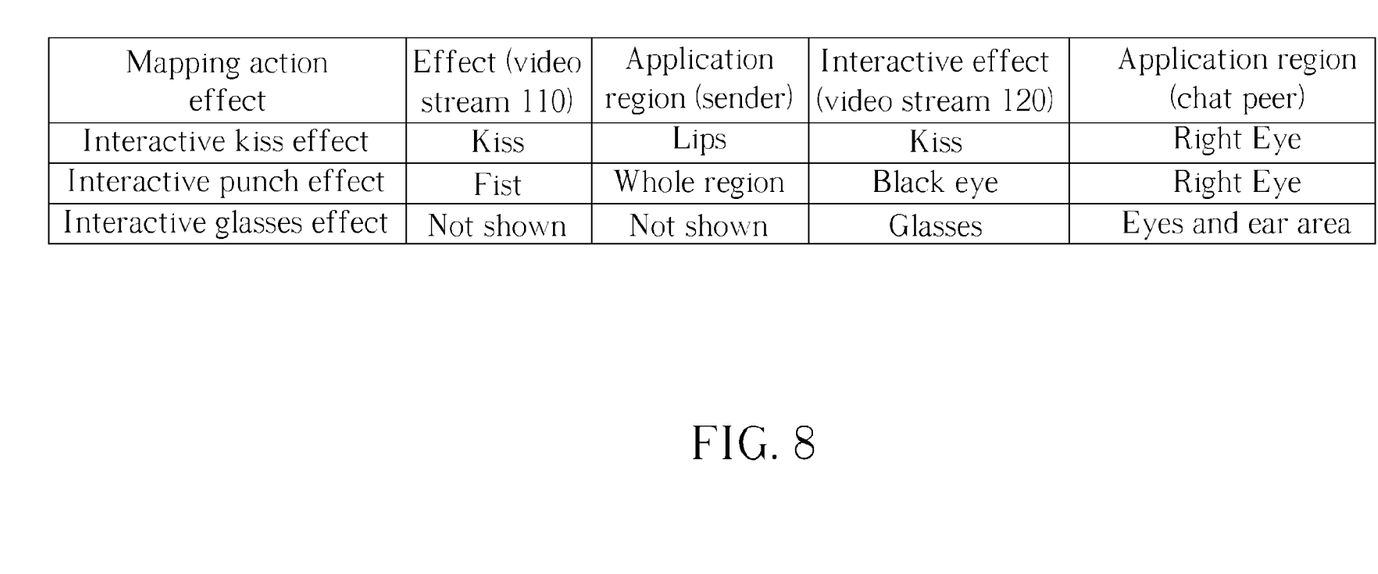
FIG. 8 is a table of mapping action effects according to the present invention.

In summary of the above description, FIG. 8 provides a table showing the mapping action effects, and their respective effects, interactive effects, and application regions at the sender and at the chat client.

Figure 6:
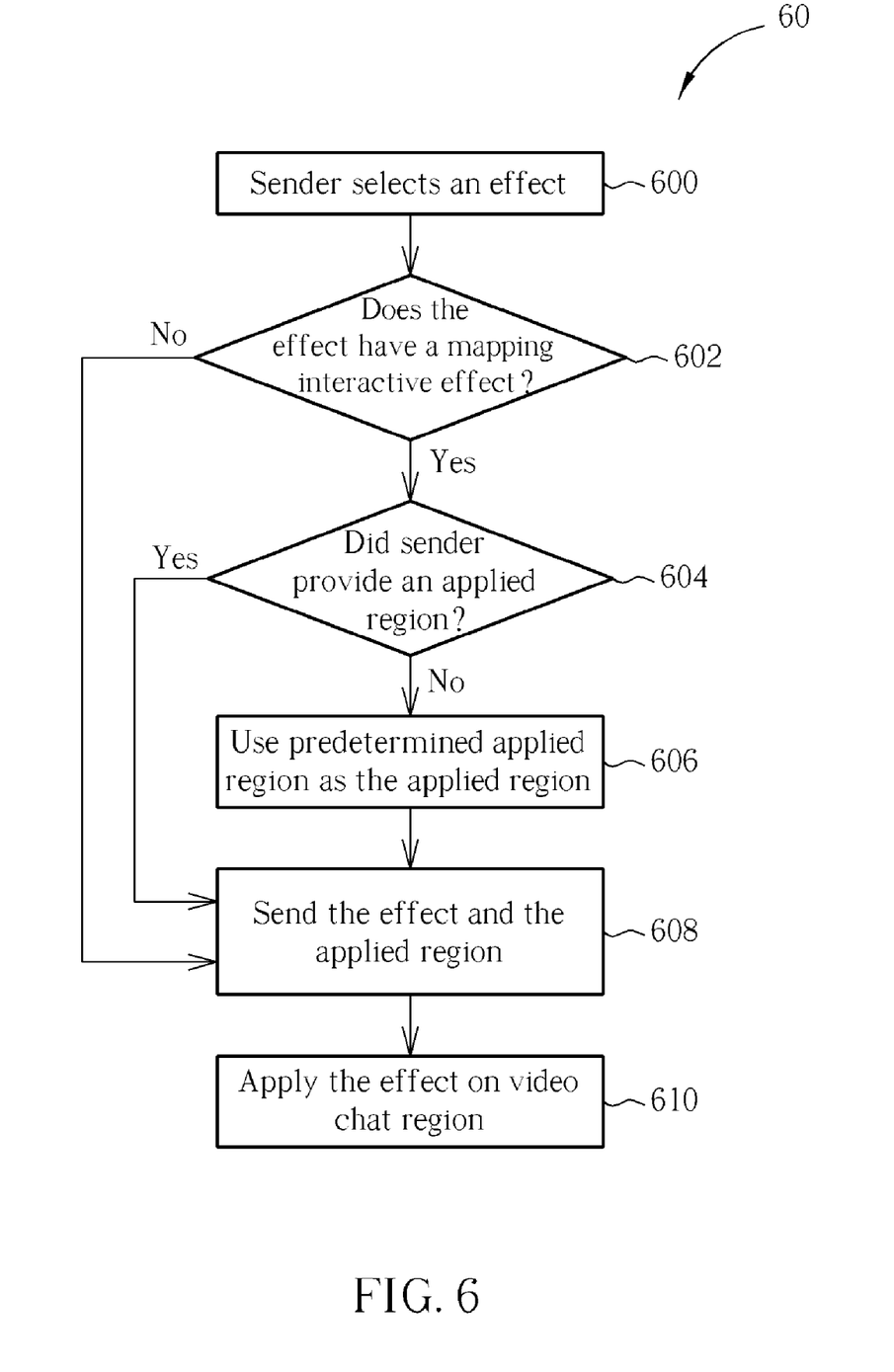
FIG. 6 is a flowchart of a process for displaying an effect in a peer chat window.

Please refer to FIG. 6, which is a flowchart of a process 60 for displaying an effect, such as the interactive kiss effect, the interactive punch effect, or the interactive glasses effect mentioned above. The process 60 may be integrated as program code in the chat client, and any steps described may be executed by the processor 102.

In the process 60, the sender, e.g. the first user, selects the effect (Step 600), for example the interactive kiss effect described above, and the sender may also select a target chat client for the effect, such as the second user. The processor 102 may check for the interactive effect in the memory 100. The checking step can be performed by either the sender of the first electronic device 200 or the chat client of the second electronic device 202. Two scenarios may arise. The sender may select the effect, and check whether the memory has a mapping action effect list or not, and if yes, the sender may send the interactive effect to the chat client. Or, when the sender selects the effect and sends it to the chat client, as the chat client is receiving the effect signal, the chat client may check whether the memory has a mapping action effect list or not. If yes, the chat client displays the interactive effect. If the effect has a mapping action effect (Step 602), which may be a predetermined mapping action effect, or predetermined mapping interactive effect, such as the kiss 330, the black eye 440, or the glasses 500, the sender may select an application region (Step 602), e.g. the cheek, the left eye, or the eyes by utilizing facial recognition technology for identifying and tracking facial features of the chat client's face. The facial recognition technology may be included in the memory 100 as a face recognition program code, which may be executed by the processor 102 to identify and track the facial features of the face of the chat client. The processor 102 may be further used to determine if a predetermined application region is set in the memory 100. If the sender does not select the applied region (Step 602), the predetermined application region, e.g. the preset described above stored in the memory 100, may be used instead (Step 606). Then, the effect and/or the application region may be sent to the second user (Step 608), as well as to each user in the conversation through the transceiver 104. The effect may then be applied to the peer chat video window or video chat region (Step 610) via the video stream 320.

Figure 7:
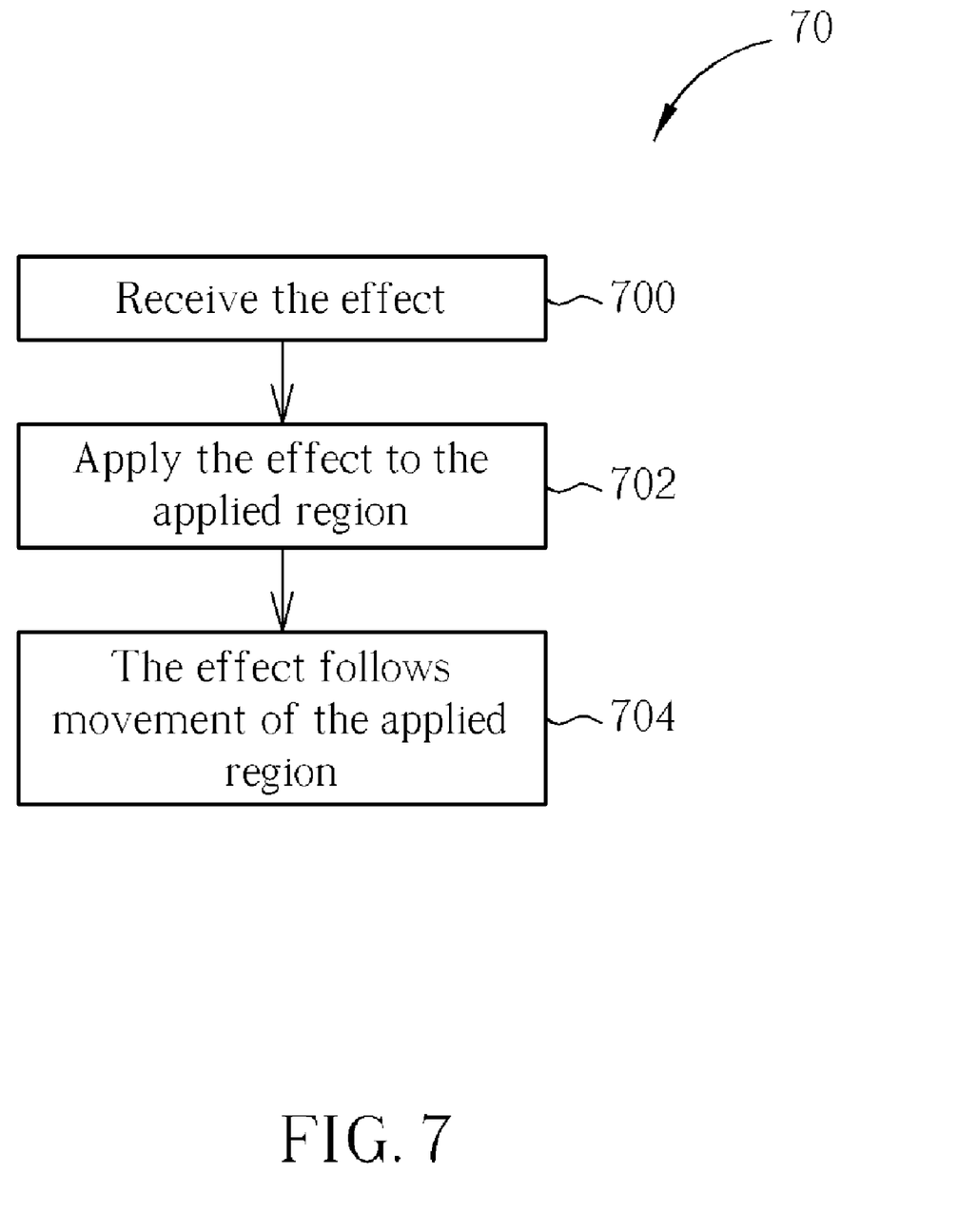
FIG. 7 is a supplementary flowchart for receiving the effect in the peer chat window.

Please refer to FIG. 7, which is a flowchart of a process 70 for applying the effect in the chat client. The process 70 may also be incorporated as program code in the chat client and executed by the processor 102.

Once the effect and the application region are received in Step 700, the chat client may apply the effect to the application region (Step 702) of the chat client video window, e.g. the video stream 320. Then, since a motion-based video is a series of frames, the chat client may track movement of the application region (Step 704), e.g. the cheek, of the chat client video window in the video stream 320 when the application region shifts between frames of the chat client video region so that the effect stays on the cheek of the chat client.

The present invention establishes a method of selecting, customizing, transmitting, and applying an interactive effect for a video region of a chat client. The present invention also describes exemplary interactive effects that may be applied to the video region. Compared to the prior art, the present invention greatly enhances applications of the video region of the chat client, and allows for greater interactivity between users who share video streams with each other in the conversation.

Those skilled in the art will readily observe that numerous modifications and alterations of the device and method may be made while retaining the teachings of the invention.

What is claimed is:

1. A method of displaying multiple effects from a sender of a first electronic device to a chat client of a second electronic device on a video chat region, the method comprising:
displaying an effect selected by the sender on a display of the first electronic device;
receiving with the second electronic device the effect selected by the sender;
checking in a database of the first electronic device or the second electronic device to map the effect selected by the sender to a corresponding mapping interactive effect, wherein the mapping interactive effect and the effect selected by the sender have a predetermined mapping relationship;
displaying the mapping interactive effect on the chat client of the second electronic device, wherein the effect selected by the sender and displayed on the display of the first electronic device is different from the mapping interactive effect displayed on the chat client;
applying the mapping interactive effect to an application region of the video chat region of the chat client, wherein the application region is a partial or an entire region of the video chat region; and
determining whether the sender has specified the application region of the chat client, wherein if the sender has not specified the application region, the method further comprising:
providing a mapping action effect list including at least one application region with a mapping action effect, wherein the application region is a predetermined application region when the application region has a mapping to the predetermined application region of the video chat region; and
applying the effect or the mapping interactive effect on the predetermined application region of video chat region of the chat client.

2. The method of claim 1, wherein the checking step is performed by the first electronic device or the second electronic device.

3. The method of claim 1, wherein if the sender has specified the application region, sending the specified application region to the chat client and applying the effect or the mapping interactive effect on the specified application region of the chat client.

4. The method of claim 1, further comprising: utilizing a face recognition technology for identifying and tracking facial features of a face of the chat client, and the identified facial feature is the application region.

5. The method of claim 1, wherein the application region is a facial feature comprising an eye feature, an eyebrow feature, a mouth feature, a nose feature, a lips feature, a hair feature, a face feature, a head feature, or a combination thereof.

6. The method of claim 1, wherein the effect is an image, a distortion, an animation, a video, an audio, or a combination thereof.

7. The method of claim 1, wherein the mapping interactive effect is an image, a distortion, an animation, a video, an audio, or a combination thereof.

8. The method of claim 1, further comprising displaying the effect and the mapping interactive effect simultaneously on the video chat regions of the first electronic device and the second electronic device after the sender applies the effect to an application region of the video chat region of the chat client.

9. The method of claim 1, further comprising:
the chat client tracking movement of the application region of the chat client video region when the application region shifts between frames of the chat client video region, wherein the applied mapping interactive effect moves with the movement of the application region.

10. The method of claim 1, further comprising:
the chat client modifying the effect or the mapping interactive effect.

11. The method of claim 1, further comprising:
the chat client deleting the effect or the mapping interactive effect.

12. A first electronic device for providing interactive effects in video chat, the first electronic device comprising:
a display;
data transmission circuitry;
a memory including an effect, a mapping action effect list in a database, and video chat program code, wherein the code is for applying the effect to an application region of a video chat region of a chat client of a second electronic device according to the mapping action effect list, and the application region is a partial or an entire region of the video chat region, wherein the mapping action effect list shows a predetermined relationship between different effects to be applied on a display of a sender and on the chat client, wherein the effect is displayed on a display of the sender and the database is checked for mapping the effect to a corresponding mapping interactive effect; and
a processor coupled to the display, the data transmission circuitry, and the memory for executing the video chat program code, reading the effect, checking and selecting the mapping interactive effect from the mapping action effect list, controlling the data transmission circuitry to transmit the mapping interactive effect corresponding to the effect to a chat client, controlling the display to display video of the mapping interactive effect corresponding to the effect, and determining whether the sender has specified the application region of the chat client, wherein if the sender has not specified the application region, the processor provides a mapping action effect list including at least one application region with a mapping action effect, wherein the application region is a predetermined application region when the application region has a mapping to the predetermined application region of the video chat region, and the processor applies the effect or the mapping interactive effect on the predetermined application region of video chat region of the chat client.

13. The first electronic device of claim 12, further comprising:
an input device coupled to the processor and the memory for receiving user input;
wherein the processor is for modifying the data corresponding to the effect according to the user input before transmitting the data corresponding to the effect to the chat client.

14. The first electronic device of claim 12, wherein the memory further comprises face recognition program code, and the processor is for executing the face recognition program code for identifying and tracking facial features of a face of the chat client, and the identified facial feature is the application region.

15. The first electronic device of claim 12, wherein the effect is an image, a distortion, an animation, a video, audio, or a combination thereof.

16. The first electronic device of claim 12, wherein the first electronic device is a personal computer, a notebook computer, a mobile phone, or a smart phone.

17. The first electronic device of claim 12, wherein the processor is for executing the video chat program code for determining whether the application region is set.

18. The first electronic device of claim 17, wherein the processor is for controlling the data transmission circuitry to send the mapping interactive effect and the application region to the chat client, and for controlling the display to display video corresponding to the mapping interactive effect on the application region of a video chat region corresponding to the chat client.

* * * * *